United States Patent Office 3,042,782
Patented July 3, 1962

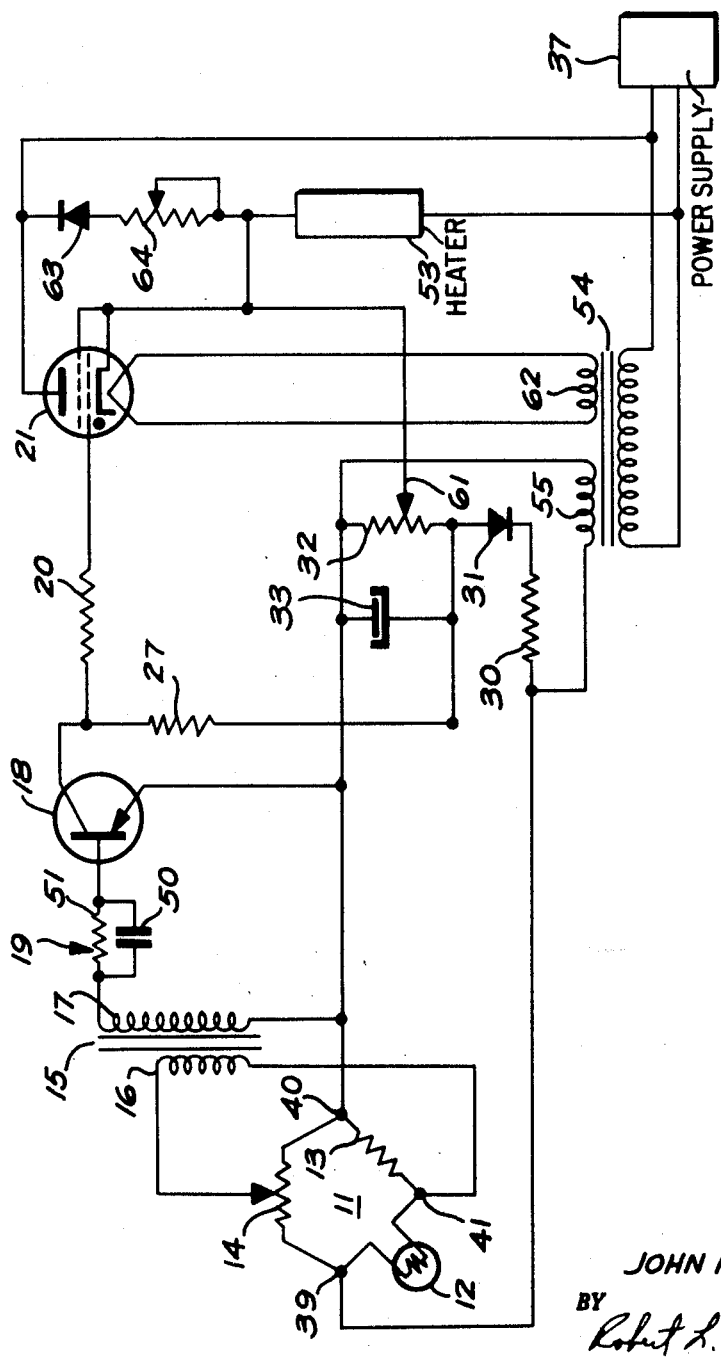

3,042,782
CONTROL CIRCUIT
John R. Bray, Pensacola, Fla., assignor, by mesne assignments, to Monsanto Chemical Company, a corporation of Delaware
Filed Aug. 14, 1959, Ser. No. 833,831
10 Claims. (Cl. 219—20)

This invention relates to control circuits and more particularly to circuits for controlling the operation of a heater to maintain a predetermined temperature.

The process of hot drawing of nylon yarn acquires an accurate control of the temperature of the yarn. In this process the yarn is drawn over a block which must be maintained at a desired temperature. One of the disadvantages of equipment used in the past for heating the block has been that the temperature of the block could not be maintained within close limits. Thus, one of the objects of this invention is to provide an improved system for maintaining a block within a fraction of a degree of a desired temperature.

Another object of this invention is to provide a system for controlling a heater to maintain a predetermined temperature.

A further object of this invention is to provide a system having a temperature sensing bridge adapted to control a heater to maintain a predetermined temperature.

A still further object of this invention is to provide a heater control system wherein negative components of an A.C. voltage are applied continually to a heater and positive components of the A.C. voltage are applied to the heater only when the temperature drops beneath a predetermined desirable operating limit.

Still another object of this invention is to provide a heat control system wherein one component of an A.C. voltage is applied to a heater to maintain a base heat or temperature level and the other component of the A.C. voltage is applied to the heater intermittently to adjust the base heat or temperature level to a predetermined value.

According to the system of the present invention, a temperature sensitive element senses the temperature of the block across which the nylon is being drawn. An output signal derived from the temperature sensitive element is amplified and used to control a thyratron tube which passes the positive component of an A.C. voltage to the heater. The negative component of the A.C. voltage is passed through the heater to maintain a base heat or temperature level slightly below the desired block temperature. The base heat level is supplemented when the thyratron passes the positive component of the A.C. voltage.

The circuit of the invention employs a thermistor to sense the temperature of the block. The thermistor is connected in a bridge circuit across which A.C. power is applied. An A.C. output signal is derived from the bridge and is stepped up by a transformer and applied by a transistor amplifier to the control grid of a thyratron. The A.C. voltage which operates a heater is applied across the cathode and plate of the thyratron. The A.C. signals derived from the bridge circuit will have one phase when the temperature is below a selected control point and will have the opposite phase when the temperature is above the control point. When the temperature is at the control point, the signal will be null. When the amplified signal applied to the grid of the thyratron is in the proper phase relationship with the A.C. voltage applied to the plate of the thyratron, the thyratron will fire. When the signal applied to the control grid of the thyratron is of the opposite phase from the voltage applied to the plate, the thyratron will not fire.

The thyratron controls the positive component or half cycles of the A.C. voltage, permitting these positive half cycles to be applied to the heater only when the sensing circuit indicates that the temperature of the block is below the desired operating temperature. Current flows through the heater during each negative half cycle, regardless of the temperature of the block.

In short, one component of the A.C. voltage is applied continually to the heater while the other component is applied to the heater only when the sensing circuit indicates that the temperature of the block is below the desired operating level. This results in a highly accurate control of the block temperature, thereby insuring that the drawing operation is carried out with optimum results.

Further objects and advantages of the invention will become apparent as the following detailed description of a preferred embodiment of the invention is read in conjunction with the single figure of the drawing, which single FIGURE shows a schematic layout of the circuit of the present invention.

Referring now in detail to the drawing, a thermistor 12 connected between terminals 39 and 41 forms one leg of a bridge 11. A resistor 13 connected between the terminal 41 and a terminal 40 forms a second leg of the bridge. The third and fourth legs of the bridge are formed by a potentiometer 14 connected between the terminals 39 and 40. The terminals 39 and 40 form two diagonal input points or terminals of the bridge 11, while the movable tap of the potentiometer 14 and the terminal 41 form the other diagonal points, or output points, of the bridge. A power source 37 applies A.C. power to transformer 54 having a secondary coil 55 connected to the input terminal points 39 and 40 for applying an A.C. voltage across the bridge 11.

A primary coil 16 of a step-up transformer 15 connected between the terminal 41 and the tap of the potentiometer 14 serves as an output circuit of the bridge 11. At a given setting of the tap of the potentiometer 14, a null signal will be produced in the output circuit of the bridge for a certain temperature of a block (not shown) across which the nylon is drawn, which temperature shall be referred to as the control point or temperature. The control point or temperature is the temperature at which it is desired to maintain the block during the drawing operation. If the temperature rises above this control point, an output signal of one phase will be generated between the terminal 41 and the movable tap of the potentiometer 14 and, if the temperature is below the control point, a signal of the opposite phase will be generated between the terminal 41 and the movable tap. The control point, or operating temperature, can be varied up or down simply by adjusting the movable tap of the potentiometer 14.

The output signal generated between the movable tap of the potentiometer 14 and the terminal 41 is applied to the primary coil 16 of the step-up transformer 15 and is stepped up in a ratio of approximately 14 to 1. The output signal induced in a secondary winding 17 of the transformer 15 is applied between the base and emitter of a PNP transistor 18. This output signal from the secondary winding 17 is applied through a phase shifting network 19 connected in series with the base of the transistor 18, the phase shifting network 19 comprising a capacitor 50 connected in parallel with a resistor 51.

The transistor 18 is connected as an amplifier. A D.C. voltage is applied between the collector and emitter of the transistor 18 from a charged capacitor 33 through a resistor 27. The capacitor 33 is shunted by a resistor 32 and is charged from a secondary winding 55 of the transformer 54 through a resistor 30 and a rectifier 31. The signal induced in the secondary winding 17 of the transformer 15 will be amplified by the transistor 18. This amplified signal is applied to the control grid of a thyratron tube 21 through a resistor 20. A tap 61 on the resistor 32 is connected to the cathode and the screen grid of the thyratron 21 to maintain a predetermined minimum voltage on these tube elements. The cathode heater of the thyratron 21 is connected to a secondary winding 62 of the transformer 54.

The cathode and plate of the thyratron 21 are connected in parallel with a diode 63 and an adjustable resistor 64 which serves to set a predetermined base heat or temperature level for a heater 53 of a well-known, electrically-operated type which heats the block across which the nylon yarn is drawn. The heater 53 is connected across the power source 37 in series with the thyratron 21 and the diode 63 and the resistor 64.

When the voltage applied by the source 37 to the plate of the thyratron 21 is negative, current will flow through the diode 63, the adjustable resistance 64 and the heater 53, but will not flow through the thyratron 21. When the voltage applied by the source 37 is positive, the diode 63 will prevent conduction through the resistor 64, but the thyratron 21 may permit a flow of current through the heater 53, depending upon whether the bridge 11 is generating an output signal to indicate that more heat is required. Thus, during all negative half cycles of the A.C. voltage, current will flow through the heater 53 to maintain a base heat or temperature level, while, during the positive half cycles of the A.C. voltage, current will flow through the heater 53 only when the bridge 11 indicates that more heat is required to maintain the block at the desired operating temperature. The base heat or temperature level may be varied by adjustment of the resistor 64.

In operating the control system of the present invention, A.C. voltage is applied to the thyratron tube 21 from the power source 37. Current flows through the diode 63, the resistor 64 and the heater 53 during each negative half cycle of the A.C. voltage, the amount of current being controlled by the setting of the resistor 64. This causes the heater 53 to apply enough heat to the block to maintain it at a base heat level or temperature slightly below the desired operating temperature. The additional heat required to maintain the block at the desired operating temperature is supplied by the heater 53 when the thyratron tube 21 conducts during the positive half cycles of the A.C. voltage in response to a signal from the bridge 11.

When the temperature of the block falls to a fraction of a degree below the desired operating value, the bridge 11 generates an output signal substantially in phase with the thyratron plate voltage. This signal is phase-shifted into precise alignment with the thyratron plate voltage by the network 19, amplified by the transistor 18 and applied to the control grid of the thyratron tube 21. This causes the thyratron 21 to conduct during the positive half cycles of the A.C. voltage from the source 37, thereby causing the heater 53 to generate additional heat for raising the temperature of the block across which the nylon yarn is being drawn. This additional heat supplements the heat generated by current flow through the heater 53 on each negative half cycle of the thyratron plate voltage, and the block temperature rises.

When the block temperature rises to the desired operating temperature, the output signal generated by the bridge 11 will drop to zero and then reverse in phase, relative to the thyratron plate voltage. This causes the thyratron to cease conducting. The only heat applied to the block at this stage will be that generated by the heater 53 as a result of current flowing through the diode 63, the adjustable resistor 64 and the heater 53 during each negative half cycle of the voltage applied by the power source 37. This heat input is not sufficient to maintain the block at the desired drawing or operating temperature. Consequently, the block temperature falls, and the above procedure is repeated.

The present system provides a very accurate temperature control, since the resistor 64 may be set to provide a constant heat input slightly below the amount of heat required, so that only a small amount of additional heat is required to maintain the desired block temperature. The heat input to the block is thus much more uniform, thereby providing a much more stable operating temperature.

The above-described system has been described for use as a temperature control in the process of hot drawing of nylon yarn. The system is, of course, applicable to many other control applications and particularly to other temperature control applications including those in which the control part is refrigerated instead of heated. It is to be understood that the above-described specific embodiment of the invention may be modified and many other embodiments may be contemplated without departing from the spirit and scope of the invention.

What is claimed is:

1. A heater control circuit, comprising an A.C. power supply, a heater, a pair of rectifiers connected across the power supply in parallel with each other and in series with the heater, said rectifiers being connected in such a manner that one of said rectifiers is adapted to conduct during every negative half cycle of the A.C. power supply to provide a base heat and the other said rectifier is adapted to conduct during positive half cycles of said power supply, means for sensing temperature, and means operated by the temperature sensing means for controlling conduction of said other rectifier to regulate the amount of heat generated by conduction of said other rectifier.

2. A heater control circuit, comprising an A.C. power supply, a heater, a pair of rectifiers connected across the power supply in parallel with each other and in series with the heater, said rectifiers being connected in such a manner that one of said rectifiers conducts to actuate the heater during every negative half cycle of the A.C. power supply to provide a base heat and the other said rectifier is adapted to conduct during positive half cycles of the A.C. power supply, a bridge having therein means for sensing temperature, and means connected to the bridge for controlling conduction of said other rectifier in response to a signal from the bridge to regulate the amount of heat generated by said other rectifier.

3. A heater control circuit, comprising an A.C. power supply, an electrically operated heater connected to the power supply, a pair of rectifiers connected across the A.C. power supply in parallel with each other and in series with the heater, said rectifiers being connected in such a manner that one of said rectifiers conducts current to the heater during every negative half cycle of A.C. power applied thereto to provide a base heat and the other of said rectifiers is adapted to conduct current to the heater during each positive half cycle of A.C. power applied by the power supply, a bridge having a thermistor therein for sensing temperature, and means connected to the bridge for controlling conduction of said other rectifier in response to an unbalanced condition in the bridge to provide additional heat.

4. A heater control circuit, comprising an A.C. power supply, a heater connected to the A.C. power supply, a pair of rectifiers connected across the power supply in parallel with each other and in series with the heater, said rectifiers being connected in such a manner that said rectifiers each conduct current to the heater on alternate half cycles of the A.C. power supply connected thereto, one of said rectifiers conducting on every alternate half cycle to provide a base rate of heat generation, a bridge connected to the power supply and having therein a thermistor for sensing temperature, said bridge producing a signal of one phase when the sensed temperature is below a predetermined value and a signal of the opposite phase when the sensed temperature is above said predetermined value, and means connected to said bridge for preventing conduction of the other one of the rectifiers in response to said signal of said opposite phase.

5. A heater control circuit, comprising an A.C. power supply, a heater connected to the power supply, a first rectifier connected across the power supply in series with the heater and adapted to conduct current to the heater during negative half cycles of the A.C. power supply, means connected in series with the first rectifier for adjusting the current flow therethrough to adjust the generation of heat by the heater during said negative half cycles, a second rectifier connected in parallel with the first rectifier and the current flow adjusting means and in series with the heater, said second rectifier being adapted to conduct current to the heater during positive half cycles of the A.C. power supply, a bridge connected to the power supply for sensing temperature and for producing a signal having one phase when the sensed temperature is below a predetermined value and a signal of the opposite phase when said sensed temperature is above said predetermined value, an amplifier connected to the bridge for applying said signals to the second rectifier in such a manner that conduction of said second rectifier is prevented when the sensed temperature is above said predetermined value.

6. A heater control circuit, comprising an A.C. power supply, a heater connected to the power supply, an adjustable resistor connected to the heater to adjust the current flow therethrough, a first rectifier connected to the adjustable resistor, said heater being connected across the power supply in series with the adjustable resistor and the rectifier in such a manner that current flows through the heater to generate heat during the negative half cycles of the A.C. power supply, said heat being generated at a rate determined by the adjustment of the adjustable resistor, a second rectifier connected across the first rectifier and the adjustable resistor so as to be in parallel with said first rectifier and said resistor and in series with the heater, said second rectifier being adapted to conduct during positive half cycles of the A.C. power supply, means for sensing temperature, and means connected to the sensing means for controlling conduction of the second rectifier.

7. A heater control circuit; comprising an A.C. power supply, a heater connected to the power supply; an adjustable resistor connected in series with the heater, a diode connected to the adjustable resistor, said heater being connected across the A.C. power supply in series with the resistor and the diode in such a manner that current flows through the heater during each negative half cycle of the A.C. power supply, said resistor being provided for varying the current flow through the heater during the negative half cycles to vary the rate of heat generation during said negative half cycles, a thyratron connected in parallel with the diode and the adjustable resistor and in series with the heater, said thyratron being adapted to conduct current to the heater during positive half cycles of the A.C. power supply, a bridge connected to the power supply and having therein a thermistor for sensing temperature, said bridge producing output signals having one phase when the temperature is below a predetermined value and signals of the opposite phase when the sensed temperature is above said predetermined value, a network connected to the bridge for shifting the phase of the signals to align said signals of one phase with said positive half cycles and said signals of opposite phase with said negative half cycles, and a transistor amplifier connected to the phase shifting network for applying the signals to the thyratron to prevent conduction of said thyratron when the sensed temperature is above said predetermined value.

8. A heater control circuit, comprising an A.C. power supply, a heater connected to the power supply, a rectifier connected to the heater, said power supply being connected across the rectifier for applying power to the heater during negative half cycles of said power supply, means connected in series with the heater and the rectifier for adjusting the current flow through the heater during negative half cycles of the A.C. power supply to provide an adjustable base rate of heat generation, a thyratron connected in series with the heater and in parallel with the rectifier and the current flow adjusting means for applying power to the heater during positive half cycles of the A.C. power supply, a temperature sensing bridge connected to the power supply and having therein a thermistor, and means responsive to signals from the bridge for controlling the conduction of the thyratron so that said base rate of heat generation is supplemented by heat generated during positive half cycles of the A.C. power supply.

9. A heater control circuit, comprising a heater, an A.C. power supply, a first rectifier connected in series with the heater across the power supply for conducting power to the heater on every negative half cycle of the A.C. power supply to provide a base rate of heat generation, a second rectifier connected in parallel with the first rectifier and adapted to conduct on positive half cycles of the A.C. power supply, and means responsive to the heat generated by the heater for controlling the conduction of the second rectifier to regulate the amount of heat generated by conduction of said second rectifier.

10. A heater control circuit, comprising a heater, an A.C. power supply, a first rectifier connected in series with the heater across the power supply for conducting current to the heater on every negative half cycle of the power supply to provide a base rate of heat generation, a second rectifier connected in parallel with the first rectifier and in series with the heater and adapted to conduct current to the heater during positive half cycles of the power supply, and a temperature sensing network connected to the second rectifier for controlling the conduction of said second rectifier to regulate the amount of heat generated by the flow of current through the second rectifier.

References Cited in the file of this patent
UNITED STATES PATENTS

| | | |
|---|---|---|
| 2,126,398 | Knowles | Aug. 9, 1938 |
| 2,546,926 | Hart | Mar. 27, 1951 |
| 2,664,489 | Dickey | Dec. 29, 1953 |
| 2,958,008 | Bray et al. | Oct. 25, 1960 |